United States Patent Office 3,410,941
Patented Nov. 12, 1968

3,410,941
PREPARATION AND SPINNING OF NITRIC ACID POLYACRYLONITRILE SOLUTIONS
Roland Dagon and Camille Nordmann, Fribourg, Switzerland, assignors to Lonza Ltd., Gampel, Valais, Switzerland, direction: Basel, Switzerland
No Drawing. Continuation-in-part of abandoned applications Ser. No. 258,960, Feb. 14, 1963, and Ser. No. 402,615, Oct. 8, 1964. This application Mar. 30, 1967, Ser. No. 626,936
Claims priority, application Switzerland, Feb. 16, 1962, 1,952/62; Oct. 9, 1963, 12,393/63
9 Claims. (Cl. 264—182)

ABSTRACT OF THE DISCLOSURE

Acrylonitrile is polymerized in a concentrated nitric acid, and the polymer solution is spun into a nitric acid bath of lower concentration. The nitric acid of the spinning bath may be recovered and reused as solvent for the monomer.

This application is a continuation-in-part of our applications Ser. No. 258,960, filed Feb. 14, 1963, and 402,615, filed Oct. 8, 1964, both now abandoned.

This invention relates to the preparation and spinning of synthetic fibers from nitric solutions of polymers and copolymers of polyacrylonitrile.

It is known to prepare spinnable polyacrylonitrile solutions by dissolving the polyacrylonitrile in concentrated nitric acid. In the industrial utilization of such nitric acid solutions of polyacrylonitrile, as they are disclosed in Patent No. 2,878,097 and particularly in Patent No. 2,928,715, a serious drawback developed. The solutions contained always jelly-like inclusions which in spinning produced acclusions of the spinnerets; as a result the carrying out of the process was rendered more difficult and the obtained fibers were not of uniform quality. In order to remove the inclusions, filtrations through high pressure filters was necessary, which are of high running and maintenance cost and therefore constitute a serious economic draw-back.

Said jelly-like inclusions are believed to be polymer agglomerations which are not properly dissolved but only swollen. Attempts to avoid formation of such gel inclusions by using higher concentrated acids or higher temperatures were not successful and produced other drawbacks.

We have found the formation of obnoxious persistent jelly-like inclusions is prevented and that the filtration of the nitric acid polyacrylonitrile solutions for spinning can be avoided when the polyacrylonitrile is preformed by polymerizing the monomer in the concentrated nitric acid itself.

Former investigators in the polyacrylonitrile art had, from the start, discarded any idea of contacting also monomeric acrylonitrile with concentrated nitric acid because of the well known differences in the chemical behavior of the monomer and polymer. Whilst polyacrylonitrile was known to be very resistant to strong inorganic acids under specific conditions as pointed out in patent specification 2,928,715 due to the close packing of adjacent chains which protects the otherwise very reactive nitrile groups and is considered responsible for the quite unique properties of the polymer, it was also well known that the monomer is extremely reactive. The monomer has two readily accessible reactive groups, the double bond and the nitrile group. In contrast to the polymer, where the nitrile groups are believed to be so close as to enter some form of strong linkage with each other, the nitrile group in the monomer has still its normal activity. The double bond is known to attach readily water under the catalytic influence of acids, including nitric acid (see e.g. G. M. Schwab, Handbook of catalysis, vol. VI, 2nd part, p. 37), and the nitrile group in monomeric nitriles is easily saponified by treatment with concentrated nitric acid (e.g. Ger. Patent No. 627,029).

Under these circumstances, the discovery that acrylonitrile monomer could be kept unattacked in concentrated nitric acid solution for a time sufficient to achieve polymerization, came as a complete surprise.

It has been known to polymerize acrylonitrile in dilute nitric acid where the $NO_3^-$ ions were used in coaction with oxalate ions to act as polymerization catalysts. In said known process, very low nitric acid concentrations were used so that water, and not the nitric acid, acted as solvent for the monomeric acrylonitrile, whereby the polymer, when formed, precipitated and did not remain in solution.

According to the invention, acrylonitrile is polymerized in nitric acid of a concentration sufficient to maintain the polymer in solutions under conditions where no gel inclusions are formed in the polymer and where the monomer is substantially not decomposed or hydrolyzed. Said conditions require that the acrylonitrile is dissolved in an aqueous nitric acid containing 50 to 75 percent, preferably 50 to 68 percent, by weight of $HNO_3$ to a solution which contains preferably 5 to 30 percent by weight of the monomer whereby the temperature of the solution is maintained below 20° C., preferably in the range of $-15$ to $+15°$ C.

The acrylonitrile polymer can be obtained either by homopolymerization or by copolymerization with other polymerizable ethylenically unsaturated compounds, whereby however, the polymer should contain at least 80 percent by weight of acrylonitrile units. Such copolymerizable compounds are, for example, vinyl compounds whose stability is not substantially inferior with respect to the polymerisation medium than acrylonitrile itself, such as vinyl pyridine, vinyl esters, styrene or methylstyrene, N-vinylsuccinimide, acrylic, methacrylic and itaconic acid and their derivatives or homologues such as their esters, amides, etc; unsaturated sulfonic acids such as vinyl, allyl, methallyl, styrene sulfonic acid and their salts; unsaturated nitriles such as methacrylonitrile or vinylidene cyanide.

The monomer is introduced into the solvent in amounts of up to 30 preferably from 10 to 30 percent by weight, calculated on the solvent.

Nitric acid of an $HNO_3$ content of 50 to 75% by weight is an excellent solvent of acrylonitrile, as shown in the following table giving the solubilities of acrylonitrile at 3° and 18° C.

| Percent HNO₃ | Percent acrylonitrile in saturated solns. at— | |
|---|---|---|
| | 3° C. | 18° C. |
| 0 (water) | 7 | 7 |
| 10 | 7.5 | 9 |
| 20 | 12 | 12 |
| 40 | 30 | 32 |
| 50 | 59 | 62 |
| 52 | 63 | Infinite |
| 55 and more | Infinite | Do. |

The stability of the acrylonitrile, dissolved in aqueous nitric acid of 50–75 $HNO_3$ content is remarkable and unexpected. Even after prolonged standing, for instance for 152 hours at 3° C. or for 48 hours at room temperature, neither addition of water to the double bond nor nitration of oxidation could be observed.

Also the stability of the nitrile groups of the acrylonitrile in nitric acid of the recited concentrations is surprisingly good. No hydrolysis of the nitrile group can be observed in 60% nitric acid at room temperature of at 3° C. after 24 hours or 48 hours standing, respectively.

The process of the invention consists essentially in dissolving monomeric arcrylonitrile in aqueous nitric acid containing 50 to 75, preferably 54 to 68 percent, by weight of $HNO_3$ and polymerizing the acrylonitrile in said solution in the presence of a catalyst. Generally, temperatures below 30° C., preferably between 20 and −10° C. or −15° C. have to be used if polymers having undegraded nitrile groups are to be produced. The temperature has greater influence on the hydrolytic degradation of the nitrile groups than the $HNO_3$ concentration in the solvent.

The above general description will allow to adjust readily the operating conditions for each case by a few preliminary tests, whereby also the shelf life of the polymer solution prior to its application must be taken into account for time calcutions. For short times, for instance for 1 to 2 hours, the polymerization temperature in 60% nitric acid may be higher, for instance 30 to 50° C. without causing any hydrolysis effects in the monomer or polymer. However, as soon as the polymerization is terminated at such operating temperatures, the system must be cooled very quickly, preferably to temperatures below 10° C. because standing or storage of the formed polymer solution at said higher temperatures would quickly result in a product having hydrolyzed nitrile groups.

Although polymerization takes already place in nitric acid having an $HNO_3$ content as said above, the polymerization must be carried out in presence of a suitable catalyst or catalyst system.

Numerous polymerization accelerators are available to adjust the rate of polymerization. Suitable catalysts are organic and inorganic azocompounds, such as 2,2′-azodi-(isobutyronitrile), 2,2′-azodi (2,4-dimethylvaleronitrile), azodisulfonic acid; per acids such as peracetic acid, perbenzoic acid, peroxymonosulfuric acid (Caro's acid), peroxydisulfuric acid, peroxynitric acid; organic peroxides, such as benzoyl peroxide, acetyl peroxide; perborates, and the like.

Catalytically acting redox systems may be formed by adding to the nitric acid solvent or to the recited oxidizing compounds small amounts of readily oxidizable substances, such as alkali metal bisulfites; sulfinic acids, such as formamidinsulfinic acid, benzenesulfinic acid; ascorbic acid; and similar compounds.

Traces of certain metals such as iron, copper, titanium, silver, have an activating effect on the polymerization accelerators. The metals are used in an amount which does not exceed 1% of the monomer involved. The mechanism of this activation is not exactly known as said metals alone have no catalytic action on the polymerization.

The rate of polymerization may also be influenced by UV-irridiation. UV-irridiation may however also be used in addition to the above mentioned polymerization accelerators or accelerating systems.

According to a preferred embodiment of the invention, the polymerization is carried out in the presence of a catalyst system consisting of a peroxydic compound and a metal dicarbonyle compound.

Suitable peroxidic compounds are, for instance, peroxydisulfuric acid and its alkali metal salts, peroxymonosulfuric acid (Caro's acid). They are employed preferably in amounts of 0.0001 to 0.02 mole per mole of monomer.

The metal component of the metallic dicarbonyl compound may be for instance copper, iron, silver, vanadium or uranium, the two latters in their vanadyle or uranyle form.

The dicarbonyl component of the metal dicarbonyl compounds may be an organic compound containing at least two carbonyl groups one of which is capable to pass into the enol form: such compounds are, for instance, acetoacetic esters such as methylacetoacetate, acetyl acetone, benzoyl acetone, acetoacetanilide, dibenzoyl methane, barbituric acid, resorcinol, phloroglucinol.

The metal dicarbonyl compound may be added as such to the reaction mixture or may be formed "in situ". We assume that the metal dicarbonyl compound acts as an activator as its addition shortens the initiation period of the polymerization. In addition, it is possible to influence the course of the polymerization reaction and the molecular weight of the formed polymer by means of the metal dicarbonyl compound, particularly by using an excess of the metal or dicarbonyl component when the compound is prepared "in situ". It is of advantage to use 0.00001 to 0.02 mole of metal dicarbonyl compound per mole of monomer. In the preferred "in situ" formation of the metal dicarbonyl compounds, we introduce 0.00001 to 0.02 mole of dicarbonyl compound and 0.00001 to 0.02 equivalent gram of metal salt per mole of monomer, capable to form the metaldicarbonyl compound such as those comprised in a group formed by copper-, iron-, silver-, nitrate, -sulfate, -borate, -carbonate, -phosphate, -arsenate.

Generally, the polymerization is carried out in a closed vessel which is equipped with stirring means and cooling and heating means. It is of advantage to sweep prior to the reaction the reaction space with an inert. gas. The reaction can be carried out continuously or as a batch process at normal, superatmospheric or reduced pressure. Preferably, the monomers are introduced in such amounts that the obtained polymer solution can be directly used or spun to filaments. As a rule, the amount of monomer will be so adjusted as to produce a solution containing 10 to 30 percent by weight of polymer. The reaction may be started with the total required amount of monomer, or only a portion may be introduced at the start and the balance may be progressively added. The polymer concentration in the solution can also be set by adding nitric acid during the polymerization so as to have at the end of the polymerization a solution whose polymer content is for example 15% if the monomer concentration in the polymerization solution is higher than 15%.

It is of particular advantage to carry out the process of the invention so as to allow the copolymerization in presence of nitric acid of temperature sensitive monomers such as unsaturated aliphatic or aromatic sulfonic acids, which improve the dyeability of the obtained fibers.

During the polymerization, the concentration of the nitric acid may be adjusted by addition of stronger or weaker acid.

If nitrogen oxides are present or developed during the processing, they may be removed by degassing under reduced pressure or by addition of small amounts of urea.

Otherwise included gases, for example those included during the polymerization such as nitrogen or air or any other gas can readily be removed during the above or separate subsequent degassing steps. Such degassing must take place at the latest before the spinneret, preferably before the spinning pump.

The reaction is carried out to obtain polymers with unmodified nitrile groups, which polymers are free of gellike swollen inclusions. The term "solution" when used herein is not used in the pure physical sense as defining a composition where each molecule is surrounded by the solvent and therefore, all individual molecules of the solid are separated from each other. We use the term "solution" in its conventional technical sense to bring out that the acrylonitrile polymer is present in a homogeneous liquid phase suitable for spinning, from which it can be regenerated.

The following examples are given to illustrate but not to limit the invention.

EXAMPLE 1

A reaction vessel of 250 cc., a glass container equipped with stirrer and cooling means was used. The container was filled with the following batch: 113 g. $HNO_3$ 60%, x g. $Fe(NO_3)_3 \cdot 9H_2O$, y g. $KHSO_5$ and z g. ammonium peroxydisulfate.

After the cooling of this solution to −5° C. the vessel was blown out with nitrogen and the monomeric acrylonitrile which was also cooled to −5° C. introduced. The polymerization was carried out at atmospheric pressure at a temperature of −3 to −5° C. in the absence of light. After 96 hours a viscous solution had been formed which was precipitated in order to determine the polymer yield by dilution of the nitric acid solution with water. In the following table are shown the results of various essays whereby the amounts x, y and z have been varied.

| x | y | z | Polymer yield after 96 hours (percent) | "k-value" | Number of hydrolyzed nitrile groups (percent) |
|---|---|---|---|---|---|
| 0 | 2 | 0 | 45 | 84.7 | Abt. 0.1 |
| 0 | 3 | 0 | 57 | 74.3 | Abt. 0.1 |
| 0.03 | 2 | 0 | 68 | 85.6 | Abt. 0.1 |
| 0.03 | 2 | 1 | 72 | 80.5 | Abt. 0.1 |

EXAMPLE 2

Into an enameled agitating vessel, there were introduced: 225 g. acrylonitrile; 1275 g. 60% $HNO_3$; 4.5 g. ammonium peroxydisulfate; 0.675 g. ascorbic acid; 0.200 g. iron powder.

The polymerization was carried out for 3 hours at 22° C. and for 4 additional hours at about 10° C. The thus formed viscous solution was precipitated in water and 182 g. of polymer corresponding to a yield of 81% were obtained. No substantial hydrolytic degradation of the nitrile groups could be observed.

EXAMPLE 3

Into an apparatus as used in Example 2, there were introduced 75 g. of acrylonitrile and 425 g. of 60% $HNO_3$. The air was displaced by nitrogen, and every 15 minutes for 90 minutes there were added at 15° C. with stirring 2 ml. of a 10% aqueous monopersulfuric acid solution and 0.1 g. of ascorbic acid. Subsequently, there were added still twice 0.1 g. of ascorbic acid each at intervals of 1 hour.

After a total of 24 hours stirring at 15° C., the viscous solution was precipitated as described in Example 1. There were obtained 71.3 g. of polymer, corresponding to a yield of 95%. Substantially no hydrolysis could be observed at the polymer molecule.

EXAMPLE 4

This test was made under the same conditions as described in Example 3 but using 75 g. of a monomer mixture consisting of: 68.6 g. acrylonitrile; 6.0 methyl-acrylate; 0.4 g. sodium methallylsulfonate.

After 24 hours of polymerization, the obtained solution was precipitated as described in Example 1 and 66 g. of polymer were obtained, corresponding to a yield of 88 percent, calculated on the monomer. The polymer contains approximately 90% acrylonitrile groups. Substantially no hydrolysis of the nitrile groups in the polymer could be observed.

EXAMPLE 5

A three-neck flask equipped with stirrer and thermometer was purged with nitrogen and cooled by an ice water bath; it was charged with 425 g. of 60% nitric acid, 75 g. of acrylonitrile, 3g. of ammonium peroxydisulfate, and 0.075 g. of $Fe(NO_3)_3 \cdot 9H_2O$, said reaction medium was cooled to 0° C., and 0.5 cm.³ of acetylacetone were added.

The reaction mixture was slowly stirred for 18 hours at a reaction temperature in the range of 0 to 2° C.: gradually, a highly viscous spinnable solution was formed which finally contained 73.5 g. of polymer, corresponding to a yield of 98%. The polymer had a k-value (according to Fikentscher) of 78.9. The IR spectrogram showed that at least 99.5 percent of the nitrile groups had been retained in the polymer molecule.

EXAMPLE 6

Under the same conditions as set forth in Example 5, 69 g. of acrylonitrile and 6 g. of methyl acrylate were copolymerized. The obtained polymer solution contained 72 g. of copolymer, corresponding to a yield of 96%. The IR-spectrum showed that about 8% of methyl acrylate is incorporated in the copolymer and that at least 99.5 percent of the nitrile groups have remained unchanged, i.e. were not hydrolyzed.

EXAMPLE 7

A stainless steel vessel cooled with brine at 0° C. and equipped with a blade agitator was carefully purged with nitrogen and charged, with stirring, with 118.330 kg. 60% nitric acid (medium), 19,108 kg. acrylonitrile (comonomer), 1.670 kg. methyl acrylate (comonomer), 0.104 kg. sodium methallyl sulfonate (comonomer), 0.840 kg. ammonium persulfate (ammoniumperoxydisulfate), 0.020 kg. $Fe(NO_3)_3 \cdot 9H_2O$.

140 cm.³ of acetylacetone were added to the reaction mixture cooled to 0° C. After a reaction time of 22 hours at about 0° C., a spinnable polymer solution was obtained. The polymer yield was 99%; the k-value of the polymer was 71.5. The solution could be spun, for instance, according to the method disclosed in U.S. Patent No. 2,878,097.

The thus obtained filaments presented good physical properties and excellent dyeability with e.g. basic dyestuffs. The IR spectrum showed that more than 99.5 percent of the original nitrile groups had remained unchanged in the polymer.

EXAMPLE 8

As described in Example 5, there were polymerized 75 g. of acrylonitrile in 425 g. of 60% nitric acid containing 3 g. of ammonium peroxydisulfate, a metal salt, and a compound containing at least 2 carbonyl groups.

The following table lists the metal salts, the compound containing at least 2 carbonyl groups, the amounts employed, the yields, and the k-values (Fikentscher) after a reaction time of 22 hours.

TABLE

| Number | Metal Salt | Compound containing at least 2 carbonyl groups | Yield, Percent | k |
|---|---|---|---|---|
| I | 0.05 g. $Cu(NO_3)_2 \cdot 3H_2O$ | 0.5 g. Acetylacetone | 97 | 81.3 |
| II | 0.075 g. $Fe(NO_3)_3 \cdot 9H_2O$ | 2.0 g. Acetoacetanilide | 96 | 84.2 |
| III | 0.075 g. $Fe(NO_3)_3 \cdot 9H_2O$ | 1.0 g. Dibenzoyl methane | 96 | 80.5 |
| IV | 0.075 g. $Fe(NO_3)_3 \cdot 9H_2O$ | 2.8 g. 5,5-dimethyl-1,3-cyclohexandione | 99 | 90.4 |
| V | 0.075 g. $Fe(NO_3)_3 \cdot 9H_2O$ | 1.0 g. Barbituric acid | 100 | 92.5 |
| VI | 0.075 g. $Fe(NO_3)_3 \cdot 9H_2O$ | 0.5 g. Phloroglucinol | 99 | 73.8 |
| VII | 0.3 g. Iron acetylacetonate | | 99 | 79.3 |

The IR spectra of the polymers showed that substantially no saponification of the nitrile groups had taken place.

EXAMPLE 9

In the same way as described in Example 5, 68 g. of acrylonitrile, 1 g. of itaconic acid, and 6 g. of methyl acrylate, were copolymerized in 425 g. of 60% nitric acid containing 0.3 g. of $Fe(NO_3)_3 \cdot 9H_2O$, 3 g. of ammonium peroxydisulfate, and 0.5 ml. of acetylacetone. After 22 hours, a solution was obtained which contained a copolymer with a k-value of 77.7 in a yield of 97%. Substantially no nitrile groups had been saponified in the polymer.

EXAMPLE 10

A mixture of 72 g. of acrylonitrile and 3 g. of dimethylaminoethylmethacrylate were polymerized as shown in Example 5. The polymer obtained with a yield of 98% had a k-value of 75.6. Fibers made from this polymer showed excellent dyeability with e.g. acidic dyestuffs.

EXAMPLE 11

A spinning solution of 15% polymer content produced as in Example 7 was degassed in vacuo and extruded through a spinneret of 3000 holes having a hole diameter of 0.12 mm., at a speed of 10 m./min. into a spinning bath having an $HNO_3$ concentration of 36% after a residence length of 2000 millimeters. The tow was drawn off at a speed of 5 m./min. on the first drawing device, then washed free of nitric acid on a drum, stretched to 800% of its original length in a hot water bath, steamed and shrunk. A yarn of 5 den. per filament in which less than 0.1% of the nitrile groups were saponified, showing a low tendency of pilling, was obtained.

In all examples, the spinning solution was homogeneous and free of streaks of jelly-like swollen inclusions.

The solution obtained according to the invention is ready for spinning and need not be ripened, although such ripening is not harmful to the solution provided that the temperature and the duration do not alterate the dissolved polymer. This would occur if such temperature was too high and the time too long. Generally speaking, it is safe to remain with the temperature below 3° C. preferably between 0° and −15° C. while the time should not exceed 72 hours at the lower temperatures.

After degassing and, if necessary, filtration to eliminate foreign matters, the solution is passed through a spinning pump to the spinnerets and is spun in an aqueous spinning bath. This aqueous spinning bath consists of nitric acid with an $HNO_3$ concentration of 0 to 46% preferably 20 to 44%. The spinning bath temperature lies preferably between +10 and −10° C. The spinning can be done with a negative or positive stretch on the first drawing device, according to the desired titer of yarns.

In addition to providing a simple and uniform economic procedure for the production of polyacrylonitrile fibers directly from the monomer, the process of this invention has the further advantage to use a single solvent, aqueous nitric acid, for the solution of the monomer, for the polymerization of the monomer, for the solution of the polymer, and as spinning bath for precipitating the filaments from the polymer solution. Therefore, if the concentration of the nitric acid in the spinning bath has become too high, said nitric acid, if necessary after further concentration, can be used as solvent for the monomer; thus, the nitric acid required for the process can be recycled.

We claim:

1. A process for the preparation of spinnable solutions of acrylonitrile polymers containing at least 80 percent of acrylonitrile units, the balance being ethylenically unsaturated compounds copolymerizable with acrylonitrile, said process comprising dissolving acrylonitrile monomer in concentrated aqueous nitric acid containing 50 to 75 percent by weight of $HNO_3$ at a temperature in the range of −15 to +30° to a solution containing up to 30 percent by weight of said monomer, and polymerizing said monomer in said solution in the presence of a polymerization catalyst.

2. The process as claimed in claim 1 wherein the concentrated nitric acid has an $HNO_3$ content of 54 to 68%.

3. The process as claimed in claim 1 wherein said catalyst is a peroxide compound in an amount of 0.0001 to 0.02 moles per mole of monomer.

4. The process as claimed in claim 1 wherein said catalyst is present together with 0.00001 to 0.02 moles, per mole of monomer, of a metal dicarbonyl compound of a metal selected from the group consisting of copper, iron and silver.

5. The process as claimed in claim 1 wherein the dicarbonyl compound is formed "in situ" whereby 0.00001 to 0.02 moles of dicarbonyl compound and 0.00001 to 0.02 equivalent grams of a salt comprised in the group consisting of copper -, iron-, silver -, -nitrate, -sulfate, -borate, -carbonate, -phosphate, -arsenate are employed.

6. An aqueous solution having a temperature of −15 to +15° C. containing 50 to 75% nitric acid and dissolved therein 10 to 30 percent by weight of monomeric acrylonitrile, said solution being stable for a period of time sufficient to allow shipping thereof from a monomer production station to a polymerization station.

7. A process for producing polyacrylonitrile fibers containing at least 80 percent of acrylonitrile units, the balance being ethylenically unsaturated compounds copolymerizable with acrylonitrile, said process comprising dissolving acrylonitrile monomer in concentrated aqueous nitric acid containing 54 to 68 percent by weight of $HNO_3$ at a temperature in the range of −15 to +30° C. to a solution 10 to 30 percent by weight of said monomer, polymerizing said monomer in said solution in the presence of a polymerization catalyst, passing said polymer solution through a spinneret into a spinning bath containing 20 to 46 percent by weight of $HNO_3$, maintaining the temperature of said spinning bath in the range of +10 to −10° C., thereby forming fibers and washing, stretching and drying said fibers.

8. A process as claimed in claim 7 wherein said catalyst is an inorganic peroxidic compound in an amount of 0.0001 to 0.02 moles per mole of monomer together with 0.0001 to 0.02 moles per mole of monomer of an metal dicarbonyl compound of a metal selected from the group consisting of copper, iron and silver.

9. A process as claimed in claim 7 wherein the $HNO_3$ concentration of the spinning bath is maintained at its level by adding washing water, and taking the overflow to a distilling step distilling said overflow and recovering nitric acid with an $HNO_3$ content of 50 to 68% by weight.

References Cited

UNITED STATES PATENTS

| | | | |
|---|---|---|---|
| 2,612,490 | 9/1952 | Gould | 260—88.7 X |
| 3,073,669 | 1/1963 | Fujisaki et al. | 264—206 X |
| 3,080,209 | 3/1963 | Fujisaki et al. | 264—206 X |
| 3,147,322 | 9/1964 | Fujisaki et al. | 264—182 |
| 3,202,641 | 8/1965 | Nakajima et al. | 260—29.6 |
| 3,287,304 | 11/1966 | Fujisaki et al. | 260—29.6 |

FOREIGN PATENTS

| | | |
|---|---|---|
| 628,520 | 8/1963 | Belgium. |
| 3,511,687 | 8/1960 | Japan. |

JAMES A. SEIDLECK, *Primary Examiner.*

J. H. WOO, *Assistant Examiner.*